Jan. 19, 1960  F. YARON  2,921,967
METHOD FOR THE HALOGENATION OF UNSATURATED HYDROCARBONS
Filed June 18, 1957
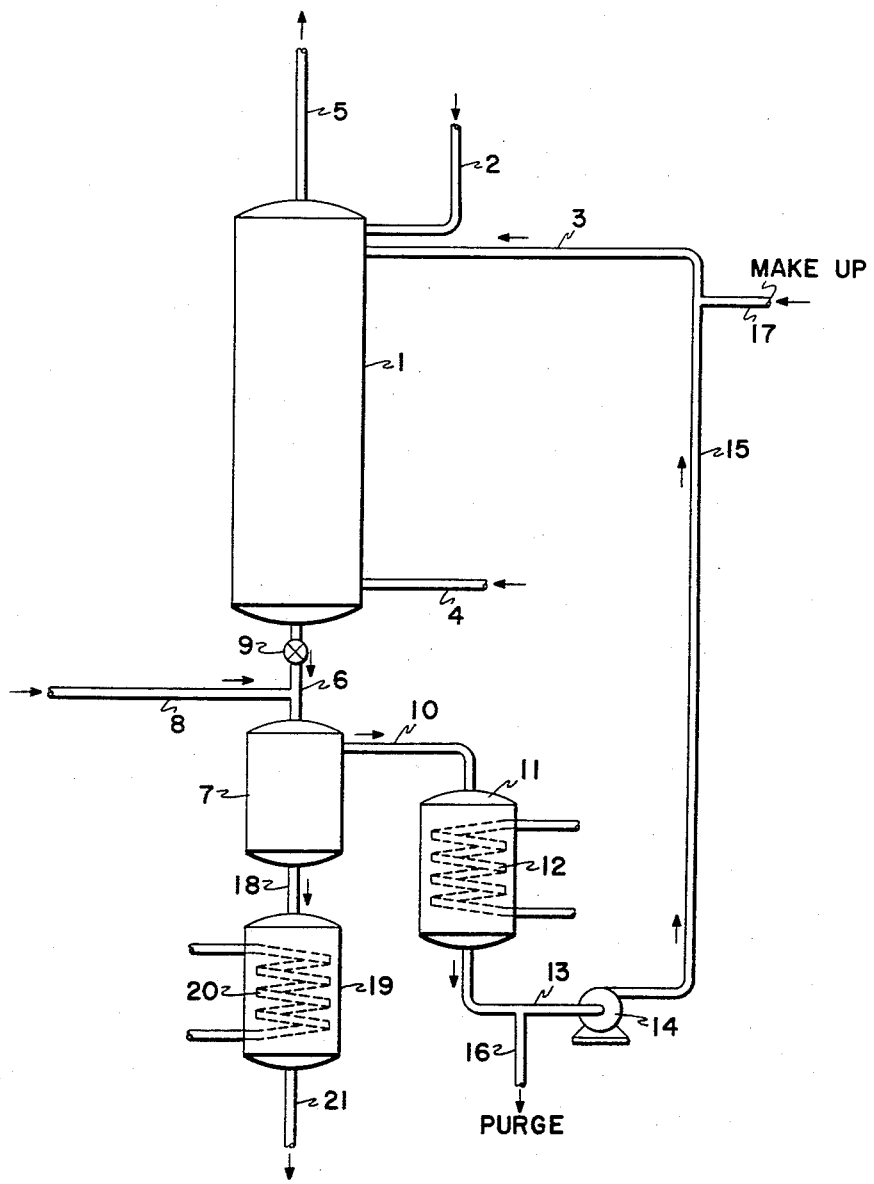
Faivel Yaron  Inventor
By  *G. F. Main*  Attorney

United States Patent Office

2,921,967
Patented Jan. 19, 1960

2,921,967

METHOD FOR THE HALOGENATION OF UNSATURATED HYDROCARBONS

Faivel Yaron, Jerusalem, Israel, assignor to Dead Sea Bromine Company Ltd., a corporation of Israel Application June 18, 1957, Serial No. 666,398

19 Claims. (Cl. 260—660)

This invention relates to an improved method for the halogenation of unsaturated hydrocarbons, preferably by a continuous process wherein the desired halogen is contacted with the unsaturated hydrocarbon in the presence of certain liquid heat exchange media. This invention especially concerns the preparation of olefin bromides by the reaction of bromine and a low molecular weight olefin in the presence of a concentrated aqueous inorganic salt or acid solution.

Two very serious problems confronting the manufacturer of olefin halides such as ethylene dibromide, are (1) the removal of heat from this highly exothermic reaction and (2) the handling of highly corrosive halogen-olefin halide mixtures. The latter problem is particularly important in continuous operations wherein formerly special acid resistant apparatus has been required to cool the reaction product.

Even in a batch type operation heat dissipation is a major problem. Problems arise due to the heat changes during this exothermic reaction which make control difficult. While the reaction rate is slow at the start it rapidly increases as the product builds up and decreases as reactant halogen decreases in concentration. Thus in a continuous system the heat given off by the reaction will vary depending on the rate of reaction within the reactor, making control difficult. In order to maintain product purity at a relatively high level it is essential that the temperature be maintained below a certain maximum, e.g. 100° C. Temperatures above 100° C. may be employed; however, if they are in excess of the boiling point of the product it would be hazardous and result in substantial loss of product.

This invention, as will be described hereinafter, provides a process for the production of halogenated hydrocarbons wherein the heat of reaction is dissipated within the reactor and during the halogenation reaction by novel means.

This invention also provides a process wherein the need for corrosion-resistant cooling apparatus is eliminated. This invention also eliminates the need for pumping corrosive solutions comprising free halogen.

This invention further provides a system of heat exchange whereby the conversion level per pass may be maintained at a maximum.

A preferred method in accordance with this invention comprises continuously passing halogen and unsaturated hydrocarbon into a corrosion resistant reactor, preferably packed with an inert material to provide ample surface area, at reduced temperatures and continuously introducing a cooled aqueous inorganic salt or acid solution as the heat exchange medium. Halogen reactant is introduced into the upper portion of the reactor and hydrocarbon into the lower portion to provide a countercurrent contact of the reactants. The exact point of entry for the olefin and halogen may vary and is determined generally by the reaction conditions including the temperature of the coolant and the respective rates of flow. With a smaller distance between the inlet points of olefin and halogen less contact time is provided and slower feed rates will be required. The coolant comprising an aqueous inorganic solution will also be introduced to the upper portion of the tower, the temperature, exact point of entry and rate of flow being controlled if desired to maintain the reaction conditions at an optimum, for the preparation of high purity product in good yields. Product alkylene halide is withdrawn from the bottom portion of the reactor and passed to a separator where product and coolant are held up or stored for a time sufficient to permit phase separation, whereupon an upper aqueous phase and a lower organic halogenated hydrocarbon phase are formed. The halogenated hydrocarbon is then passed to a cooling zone to bring the temperature down to any desired level. The aqueous coolant recovered from the separator at an elevated temperature is then recooled and recycled to the upper portion of the reactor.

This invention is amenable to the preparation of halogenated hydrocarbons employing as reactants ethylene, propylene, butylene and isobutylene, and higher molecular weight olefins as well as diolefins such as butadiene and acetylenes. Halogen reactant may comprise bromine or chlorine in liquid or gaseous form or dissolved in water. By far the most commercially important product today is ethylene dibromide which is in current use as a scavenger for gasoline containing tetraethyl lead. As coolant for this process there may be employed aqueous solutions of hydrogen chloride, hydrogen bromide, alkali metal bromide, alkaline earth metal bromide and in general all inorganic water soluble bromides or chlorides may be used. Aqueous solutions of various bromides such as sodium bromide, potassium bromide, ammonium bromide, calcium bromide and hydrogen bromide are especially effective as coolants and are preferred. Alternatively the corresponding water soluble inorganic chlorides, although less effective, may be employed. Other salts which may be used include sodium iodide, potassium iodide, hydroiodic acid, ammonium iodide, sodium nitrate, ammonium nitrate, sodium sulfate.

For ease of description reference will be had to the preparation of ethylene dibromide although it is to be understood that various other halogenated hydrocarbons, as noted above, may be prepared by this process. Referring now to the drawing the sole figure shows schematically an outline of the process of this invention. Bromine is introduced into reactor 1 via line 2. Reactor 1 is preferably made of corrosion resistant material such as glass, stoneware or the like and may be packed with inert material such as Raschig rings, Berl saddles or the like. Preferably the rate of flow for the reactants, i.e. ethylene and bromine, is such that all of the bromine is reacted within the tower 1. Accordingly bromine is employed in no greater than stoichiometric quantities. In the event, however, that excess bromine is employed it may be neutralized with ammonia, caustic, etc., after the product mixture has left the tower. The aqueous coolant is fed into the tower via line 3 at a rate and temperature such that the reaction mixture is constantly maintained between 70° to 100° C. Ethylene gas is introduced via line 4; however, it is to be understood that the exact entry points for the bromine, ethylene and coolant may be adjusted to control contact time and temperature within the reactor. Unreacted ethylene gas may be vented via line 5 and recycled if desired. Product ethylene dibromide and the aqueous coolant are continuously withdrawn from the reaction tower 1 via line 6 to separator 7 which may be made of any convenient structural material, e.g., steel or the like. Preferably the product effluent entering separator 7 contains substantially no bromine; however, if small amounts are present in the product mixture a mild base such as ammonium hydroxide or dilute caustic may be added via line 8 or any other convenient place to neutralize the mixture.

Valve 9 may be employed to control the withdrawal rate from tower 1. Phase separation occurs rapidly in separator 7 since ethylene dibromide has a relatively high specific gravity in comparison with the aqueous solution employed as coolant. The aqueous solution is withdrawn from an upper portion of separator 7 via line 10 and passed to cooler 11 which may be of conventional design containing cooling coils 12, thence to pump 14 via line 13 and recycled via lines 15 to the reactor tower. Purge and make-up lines 16 and 17 may be provided to maintain the coolant at any desired concentration. For the coolant it has been found that high inorganic bromide compound concentrations in the order of 2 to 6 moles per liter are necessary to obtain good yields of product. The concentration will be dependent to some extent on the particular salt or acid employed. Ethylene dibromide is recovered as the bottoms phase from separator 7 and passed via line 18 to a conventional cooler 19 containing cooling coils 20 and product is recovered via line 21.

The following table shows the general conditions which are best suited for the production of olefin dihalides of high purity in good yields. The specific conditions are for the production of ethylene dibromide with aqueous NaBr coolant.

TABLE

| Reactants | Specific | General |
| --- | --- | --- |
| Halogen: | | |
| Temperature, °C | 20 | 10 to 40. |
| Flow rate, v./v./hr | 0.1 | 0.05 to 0.2. |
| Olefin: | | |
| Temperature, °C | 20 | 0 to 80. |
| Flow rate, v./v./hr | 50 | 25 to 100. |
| Coolant: | | |
| Concentration, moles/liter | 4.2 | 2 to 5.5. |
| Temperature, °C | −15 | −20 to +20. |
| Flow rate, v./v./hr | 0.8 | 0.4 to 1.6. |
| Conditions within Reactor: | | |
| Temperature, °C | 80 | 50 to (Boiling Point of Product). |
| Pressure, p.s.i.g | 1.5 | 0 to 10. |

For a more complete understanding reference is now had to the following specific examples:

Example 1

A tower constructed of glass, having the following dimensions: 12 inches in diameter, about 16.4 feet in height and packed with 1 inch glass Raschig rings, is employed. Liquid bromine is fed into the tower at a point about 6.5 feet from the top at 20° C. and at a rate of about 155 lbs./hr. Gaseous ethylene is introduced through a point about a foot above the bottom at about 29 lbs./hr., also at 20° C. and at a slight pressure of about 1.5 p.s.i.g. Coolant employed is an aqueous solution of $NH_4Br$ having a concentration of 400 grams/liter, also at 20° C. in a volume of 300 liters/hour. The mixture of coolant and product is continuously withdrawn from the bottom of the tower via line 6 of the drawing at 80° C. Ethylene dibromide is withdrawn from the glass separator 7, cooled to about 30° C. and recovered with a purity of 93%. Coolant is recycled at the rate indicated above. Standard metal cooler 11 and pump 14 are employed. Ethylene dibromide product (undistilled) is recovered at the rate of about 180 lbs./hour. The product may subsequently be distilled to any degree purity desired.

Example 2

In this run bromine is fed into the tower, also constructed of glass, at a point about 1.5 feet below the top of the tower, and aqueous sodium bromide coolant fed in at −20° C., the reactants, bromine and ethylene, were precooled to +20° C. Pressure at the ethylene entry point was about 1.5 p.s.i.g. Rates of flow were as follows: bromine, 220 lbs./hour; ethylene, 40 lbs./hour; coolant, 250 liters/hour (450 grams NaBr per liter). Product mixture withdrawn via line 6 is at 80° C. Since the coolant employed is below about 0° C., it is necessary in this example to employ for the cooling of the coolant conventional refrigerating fluids such as Freon or the like. Substantially a 100% conversion of bromine to olefin dibromide is effected in this example. Minor amounts of $NH_4OH$ and NaOH are added via line 6 to neutralize trace amounts of unreacted bromine. The salt formed during neutralization is recycled with the aqueous coolant.

Example 3

Employing a tower packed with Raschig rings, bromine is continuously added at a rate of 110 lbs./hour and at +20° C. Ethylene was fed in at the bottom at a rate of 20 lbs./hour and at +20° C., the pressure at the inlet being about 2.2 p.s.i.g. An aqueous ammonium chloride solution, 200 grams per liter, at 0° C. was continuously introduced just below the bromine inlet at a rate of 300 liters/hour.

Example 4

The procedure of Example 1 is repeated employing aqueous ammonium bromide (50 grams/liter). The recovery is 145 lbs./hour of product having a purity of 85%.

As previously noted this invention is also useful in batch operations as illustrated by the following example:

Example 5

The apparatus comprises a closed reactor (no mixer) of steel, lined with acid resistant bricks, of 70 cubic feet volume, having a cover. The cover is provided with an opening, fitted with a tower of glass, packed with glass Raschig rings. At the beginning of the process 1,000 liters of a potassium bromide solution of 450 grams/liter and 1,100 lbs. bromine are introduced. Ethylene is then bubbled at a rate of 22 lbs./hour through a glass bubbler for 9 hours. Simultaneously with the ethylene a potassium bromide solution (450 grams/liter) cooled to −15° C. is introduced at a rate of 50 liters/hour at the top of the tower, flowing down into the reactor. Temperature at the start of reaction is +20° C. The liquids in the reactor warm up gradually until at the end of the addition of ethylene the temperature reaches 95° C.

This invention has the following advantages:
(1) Corrosion resistant coolers are not required.
(2) Corrosion resistant pumps are not required.
(3) The output per reaction system and per pass is extremely high due to the efficient direct heat exchange resulting from the use of concentrated aqueous salt solutions.

What is claimed is:
1. In a process for the preparation of halogenated hydrocarbon product wherein a halogen is reacted with an unsaturated hydrocarbon at elevated temperatures, the improvement which comprises passing halogen and unsaturated hydrocarbon through a reaction zone in a countercurrent manner, continuously passing a coolant which comprises an aqueous solution containing about a 2–6 molar concentration of a compound selected from the group consisting of halogen acids and inorganic salts through said reaction zone in direct contact with the reaction mixture at a temperature and in an amount such as to maintain the temperature of reaction between 50° C. and the boiling point of the halogenated hydrocarbon product.

2. A process in accordance with claim 1 wherein said aqueous solution is an aqueous inorganic bromide solution.

3. A process in accordance with claim 2 wherein said aqueous solution comprises aqueous sodium bromide.

4. A process in accordance with claim 2 wherein said aqueous solution comprises aqueous potassium bromide.

5. A process in accordance with claim 2 wherein said aqueous solution comprises aqueous ammonium bromide.

6. A process in accordance with claim 2 wherein said aqueous solution comprises aqueous calcium bromide.

7. A process in accordance with claim 2 wherein said aqueous solution comprises aqueous hydrogen bromide.

8. A process for the preparation of ethylene dibromide which comprises reacting ethylene with bromine in a reaction zone, maintaining a coolant which comprises an aqueous solution containing about a 2–6 molar concentration of a compound selected from the group consisting of halogen acids and inorganic salts in said reaction zone in direct contact with the reaction mixture, at a temperature and in an amount sufficient to maintain the temperature in said reaction zone between 50° to 100° C., recovering ethylene dibromide.

9. A process in accordance with claim 8 wherein said aqueous solution comprises aqueous sodium bromide.

10. A process in accordance with claim 8 wherein said aqueous solution comprises aqueous potassium bromide.

11. A process in accordance with claim 8 wherein said aqueous solution comprises aqueous ammonium bromide.

12. A process in accordance with claim 8 wherein said aqueous solution comprises aqueous calcium bromide.

13. A process in accordance with claim 8 wherein said aqueous solution comprises aqueous hydrogen bromide.

14. A continuous process for the preparation of ethylene dibromide which comprises continuously passing bromine and ethylene through a reaction zone in a countercurrent manner, said bromine being employed in less than stoichiometric amounts, continuously circulating cool aqueous inorganic bromide solution at a rate of .4 to 1.6 volumes of coolant per 0.05 to 0.2 volumes of bromine, the temperature of the coolant being such as to maintain the temperature within said reaction zone between 50° to 100° C., said aqueous solution having a bromide compound concentration of from 2 to 6 moles per liter, passing reaction product to a liquid separation zone, separating and recycling aqueous coolant and recovering ethylene dibromide of high purity and in high yields.

15. A process in accordance with claim 14 wherein said inorganic bromide solution is aqueous sodium bromide.

16. A process in accordance with claim 14 wherein said inorganic bromide solution is aqueous potassium bromide.

17. A process in accordance with claim 14 wherein said inorganic bromide solution is aqueous ammonium bromide.

18. A process in accordance with claim 14 wherein said inorganic bromide solution is aqueous calcium bromide.

19. A process in accordance with claim 14 wherein said inorganic bromide solution is aqueous hydrogen bromide.

References Cited in the file of this patent
UNITED STATES PATENTS

| | | |
|---|---|---|
| 1,932,590 | Kaselitz | Oct. 31, 1933 |
| 2,393,367 | Hammond | Jan. 22, 1946 |
| 2,656,396 | Hayward | Oct. 20, 1953 |